United States Patent Office 3,003,967
Patented Oct. 10, 1961

3,003,967
METHOD FOR INCREASING THE EFFECTIVE PERMEABILITY OF MANGANESE FERRITES
Lynn J. Brady, Butler, N.J., assignor to Kearfott Company, Inc., Little Falls, N.J., a corporation of New York
No Drawing. Filed Sept. 23, 1959, Ser. No. 841,682
2 Claims. (Cl. 252—62.5)

This invention relates to ferrites and, more particularly, to a method for removing a coating on manganese ferrites.

Ferrites, which are well known in the art, are useful in electrical devices because of their ferromagnetic properties.

The techniques of powdered metallurgy are used in manufacturing a ferrite. A mixture of powdered metallic oxides, including ferromagnetic oxides, are placed in a mold, and heat and pressure are applied to effect the sintering of the metallic oxides to form a solid piece having the shape of the mold. In some cases, determined by the ultimate use of the ferrite, the shape of the mold, and the ferrite formed thereby, is quite complex.

The magnetic and electrical properties of a ferrite are determined by the formulation of the metallic oxide mixture. For instance, a manganese ferrite, composed of manganese oxide, zinc oxide and iron oxide, has a relatively high permeability, but has high electrical losses at high frequencies. Nickel ferrite, on the other hand, has a relatively low permeability, but has low electrical losses at high frequencies. Therefore the use of manganese ferrite is confined to the audio and video frequencies, while at higher frequencies the use of nickel ferrite is more effective.

It has been found that when a piece of manganese ferrite is taken from a mold, after firing, it is covered with an oxide coating which materially reduces the permeability thereof. Since high permeability is the property especially being sought in a manganese ferrite, the presence of the oxide coating is deleterious.

One way of getting rid of the oxide coating is to grind it off. However, this is an expensive procedure, especially so when the ferrite has a complex shape.

Another way of getting rid of the oxide coating, after firing, is to paint the ferrite with a refractory material, and then refire it. After this second firing the refractory material, along with the oxide coating which adheres thereto, may be removed by mechanical means. This method of removing the oxide coating is also quite expensive.

A third way of obtaining a manganese ferrite of the required high permeability is to fire the ferrite in an inert atmosphere. This method besides being relatively expensive, is not 100% effective.

The present invention is concerned with an improved way of removing the oxide coating once it has formed, which has the advantage of being substantially lower in cost than any previous method.

It has been found that a strong acid dissolves the oxide coating in a ferrite to a much greater extent than it dissolves the underlying ferrite itself. Therefore, the oxide coating may be removed, and the effective value of the permeability of the ferrite raised, by inserting the ferrite, after firing, in a strong acid and leaving it there for a time sufficient to dissolve the oxide coating. This method has the advantage that the shape of the ferrite is immaterial, so that the oxide coating may be removed from complex shapes as easily as from simple shapes. Furthermore, the acid need not be pure, so that waste acid may be used, which is extremely cheap.

It is therefore an object of the present invention to provide an improved method for removing the oxide coating from a ferrite after firing.

It is a further object of the present invention to provide a method for raising the effective permeability of a ferrite.

These and other objects, features and advantages will become apparent from the following detailed description.

In one case, a sample of manganese ferrite, having the shape of an annular cylinder, was treated after firing by inserting it for one hour at room temperature in a solution composed of two volumes of concentrated hydrochloric acid and one volume of concentrated nitric acid. Before treatment, the sample had an outside diameter of 1.25 inches, an inside diameter of 0.490 inch, a height of 0.375 inch and a permeability of 1840. After treatment the sample had an outside diameter of 1.20 inches, an inside diameter of 0.490 inch, a height of 0.356 inch and a permeability of 2130.

In another case, a sample of manganese ferrite, also having the shape of an annular cylinder, was treated after firing by inserting it for one hour at room temperature in a solution of concentrated hydrochloric acid. Before treatment, the sample had an outside diameter of 1.25 inches, an inside diameter of 0.485 inch, a height of 0.350 inch and a permeability of 1860. After treatment the sample had an outside diameter of 1.05 inches, an inside diameter of 0.515 inch, a height of 0.322 inch and a permeability of 2830.

Thus, it will be seen that the effective permeability of a manganese ferrite is substantially increased by treatment in a strong acid.

It is not intended that the invention be restricted to the preferred process disclosed herein, but that it be limited solely by the true spirit and scope of the appended claims.

I claim:
1. A method for removing the oxide coating on a manganese ferrite composed of manganese oxide, zinc oxide and iron oxide to effect an increase in the permeability thereof, comprising the steps of inserting said ferrite in an acid solution composed of concentrated hydrochloric acid, maintaining said ferrite in said solution for about one hour at room temperature, and then removing said ferrite from said solution.

2. A method for removing the oxide coating on a manganese ferrite composed of manganese oxide, zinc oxide and iron oxide to effect an increase in the permeability thereof, comprising the steps of inserting said ferrite in an acid solution composed of about two volumes of concentrated hydrochloric acid and about one volume of concentrated nitric acid, maintaining said ferrite in said solution for about one hour at room temperature, and then removing said ferrite from said solution.

References Cited in the file of this patent

UNITED STATES PATENTS

| | | |
|---|---|---|
| 90,438 | Ford | May 25, 1869 |
| 1,329,573 | Allen | Feb. 3, 1920 |
| 1,885,390 | Textor et al | Nov. 1, 1932 |
| 2,465,987 | Gorman | Apr. 5, 1949 |
| 2,509,758 | Brockman | May 30, 1950 |
| 2,601,212 | Polydoroff | June 17, 1952 |
| 2,628,199 | Lowenhein | Feb. 10, 1953 |
| 2,711,389 | Beach et al. | June 21, 1955 |
| 2,885,364 | Swartz | May 5, 1959 |